United States Patent [19]

Kinoshita et al.

[11] Patent Number: 4,811,105

[45] Date of Patent: Mar. 7, 1989

[54] IMAGE SENSOR WITH AN IMAGE SECTION AND A BLACK LEVEL DETECTION SECTION FOR PRODUCING IMAGE SIGNALS TO BE STORED AND READ OUT FROM A STORAGE SECTION

[75] Inventors: Takao Kinoshita, Tokyo; Shinji Sakai, Yokohama, both of Japan

[73] Assignee: Canon Kabushiki Kaisha, Tokyo, Japan

[21] Appl. No.: 99,607

[22] Filed: Sep. 22, 1987

Related U.S. Application Data

[62] Division of Ser. No. 748,817, Jun. 26, 1985, Pat. No. 4,737,841.

[30] Foreign Application Priority Data

Jul. 1, 1984 [JP] Japan ................. 59-136027

[51] Int. Cl.$^4$ ................ H04N 3/15; H04N 5/335
[52] U.S. Cl. .................... 358/213.24; 358/213.16; 358/213.25; 358/213.26; 358/213.29
[58] Field of Search .............. 358/213.16, 213.23, 358/213.24, 213.25, 213.26, 213.29

[56] References Cited

U.S. PATENT DOCUMENTS

| | | | |
|---|---|---|---|
| 4,010,319 | 3/1977 | Levine | 358/213.24 |
| 4,263,620 | 4/1981 | Félix | 358/213.29 |
| 4,490,744 | 12/1984 | Levine | 358/213.24 |
| 4,510,528 | 4/1985 | Bergen | 358/213.24 |
| 4,513,313 | 4/1985 | Kinoshita et al. | 358/44 |
| 4,594,612 | 6/1986 | Levine | 358/213.24 |
| 4,641,183 | 2/1987 | Kinoshita | 358/213.29 |
| 4,644,403 | 2/1987 | Sakai et al. | 358/213.26 |
| 4,663,656 | 5/1987 | Elabd et al. | 358/213.29 |
| 4,737,841 | 4/1988 | Kinoshita et al. | 358/213.29 |

FOREIGN PATENT DOCUMENTS

| | | | |
|---|---|---|---|
| 54-56717 | 5/1979 | Japan | 358/213.16 |
| 58-97972 | 6/1983 | Japan | 358/213 |
| 59-211385 | 11/1984 | Japan | 358/213.24 |
| 60-20688 | 2/1985 | Japan | 358/213 |
| 60-33783 | 2/1985 | Japan | 358/213.23 |
| 60-30281 | 2/1985 | Japan . | |

*Primary Examiner*—James J. Groody
*Assistant Examiner*—Randall S. Svihla
*Attorney, Agent, or Firm*—Fitzpatrick, Cella, Harper & Scinto

[57] ABSTRACT

An image sensing apparatus has an image section, a black level detection section, a storage section, a read out device, and a compensator. The image section is capable of receiving light and includes a plurality of horizontal shift registers juxtaposed in the vertical direction. The black level detector section is shielded from light and is formed at the start portion of transference of each horizontal shift register of the image section. The storage section is formed adjoining the image section in the horizontal direction and stores image signals produced in the image section and black level signals produced in the shielded section. The read out device reads out the signals stored in the storage section line-by-line in a horizontal scanning period. The compensator clamps a black level signal in the signals of one horizontal line read out by the read out device to a predetermined reference level.

7 Claims, 10 Drawing Sheets

IMAGE SENSOR WITH AN IMAGE SECTION AND A BLACK LEVEL DETECTION SECTION FOR PRODUCING IMAGE SIGNALS TO BE STORED AND READ OUT FROM A STORAGE SECTION

This is a division of application Ser. No. 748,817, filed 06/26/85, now U.S. Pat. No. 4,737,841.

BACKGROUND OF THE INVENTION

1. Field of the Invention

The present invention relates to an improvement of an image sensor and an image sensing apparatus including a plurality of line sensors.

2. Description of the Prior Art

Interline transfer type CCDs or MOS type sensors have been used heretofore for converting, e.g., one sheet image information into sequential signals for two fields.

Sensors of this type, however, are associated with drawbacks that the rate of opening becomes small and the sensitivity of a sensor is degraded since transfer paths, gates and the like are formed within the light reception area of the sensor. Furthermore, manufacturing such semiconductors with high integration density necessitates a particular technology, thereby resulting in a low yielding. Also the number of pixels is limited.

In constrast with the above, the use of frame transfer type CCDs can solve such problems. However, it has been considered that one sheet image information cannot be converted into a two-field sequential signal by using the frame transfer type CCDs.

In view of this, the applicant has proposed an image sensing apparatus capable of eliminating this drawback and disclosed in Japanese Patent Application No. 58-138551, published as Japanese Kokai 60-30281. More specifically, in the proposed image sensing apparatus, the use of an image sensing apparatus made of a plurality of line sensors disposed in the horizontal direction has permitted obtaining an interlaced two-field signal from a single operation of image sensing.

SUMMARY OF THE INVENTION

It is an object of the present invention to provide an image sensor and an image sensing apparatus having less color mixing by improving the image sensing apparatus disclosed in Japanese Patent Application No. 58-138551.

According to the present invention made to achieve the above object, it is possible to add and read two line information as well as to read every second line information. A high sensitivity is also possible in the case of performing field readout.

According to the invention, no color mixing occurs even in the case of the addition of two line information. It is advantageous in that moire at the edge of an object even with a high color saturation degree is imperceptible.

According to an embodiment of the image sensing apparatus, the provision of an image sensor section made of a plurality of horizontal line sensors, a color separation filter having a repetition pattern of plural color filters for each line sensor and shifting the repetition pattern in phase relative to the adjoining line sensors, and signal processing means for generating a luminance signal for each line by using the output from each line sensor, provides an advantageous effect that moire at the edge of an object even with a high color saturation degree is imperceptible.

According to another embodiment of the image sensing apparatus, the provision of an image sensor section made of a plurality of line sensors, the pixels of each line sensor being shifted in phase by half a pixel at every second line sensor, and readout means for reading out each line information in the image sensor section, enables to add and read out two lines of information as well as to read out every second lines of information. A high sensitivity is also possible in the case of performing field readout.

According to an embodiment of the image sensor of the present invention, the provision of a plurality of pixels disposed in a line and a column, an electrical charge drain section formed between predetermined pixels in the direction of line, and transfer electrodes for transferring electrical charges of each pixel in the direction of a line, and the arrangement that at least part of the transfer electrodes is covered with the electrical charge drain section, permits reduction of the resistance of the transfer electrodes without deteriorating the rate of opening the image sensor section.

According to another embodiment of the image sensor of the present invention, the provision of an image sensor section having a plurality of horizontal shift registers, a buffer section for adding and transferring signals of the plurality of horizontal shift registers, and a drain section formed along a transfer path of the buffer section for draining excessive electrical charges, prevents overflow of electrical charges even in the case of adding and transferring the two line signals of the image sensor section.

According to an embodiment of the image sensing apparatus of the present invention, the provision of an image sensor section comprising a plurality of single phase horizontal line sensors having fixed potential sections and variable potential sections, a plural kind of color filters disposed in front of the horizontal line sensors, and a light shield section for preventing incident light on a portion of the variable potential sections of the image sensor section, permits prevention of color mixing between potential wells.

According to another embodiment of the image sensing apparatus of the present invention, the provision of an image sensor section comprising a plurality of horizontal line sensors and a light shield section formed at the start of the transfer path of the horizontal line sensors, and the arrangement that smear of the image sensor section is prevented by clamping each horizontal line sensor information with reference to the signal level of the light shielding section, enable both to clamp information and prevent smear at the same time, thereby resulting in a simple circuit arrangement.

According to another embodiment of the image sensor of the present invention, the provision of an image sensor section comprising a plurality of horizontal line sensors, readout means for sequentially reading out the signals of the image sensor section starting from the predetermined line to the last line, and an electrical charge injection section for injecting electrical charges at least into those horizontal line sensors adjacent to the last line of the plurality of horizontal line sensors, allows monitoring the image sensor relatively with ease.

DETAILED DESCRIPTION OF THE EMBODIMENTS

The present invention will be described in detail hereinunder in connection with the embodiments.

Figure 1:
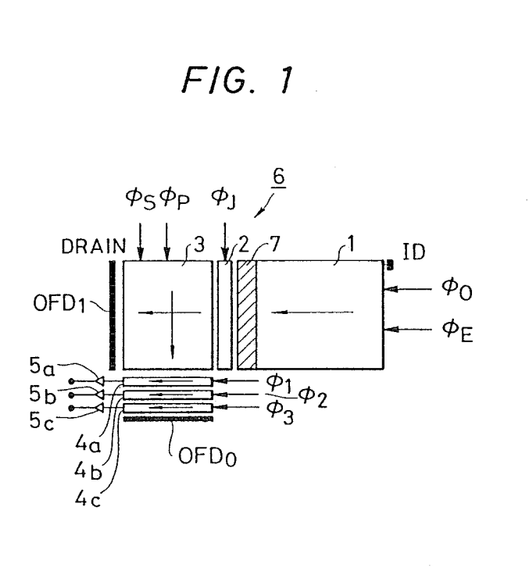
FIG. 1 is a schematic view of an image sensor according to the present invention.
Figure 2:
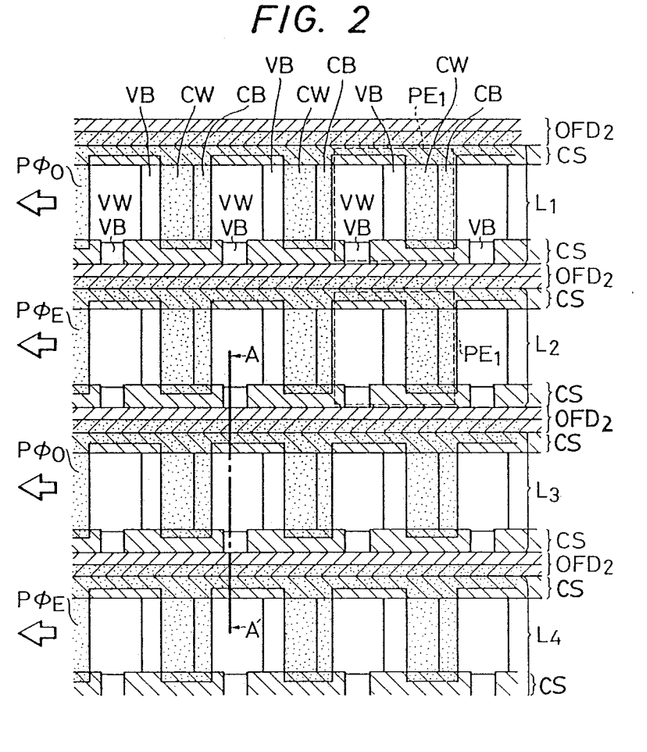
FIG. 2 shows an example of the structure of the image sensor section.

FIG. 1 is a schematic diagram showing an example of the structure of an image sensor 6 according to the present invention, and FIG. 2 is a schematic diagram showing the electrode disposal of the image sensor section of FIG. 1. In the figures, numeral 1 denotes an image sensor section, numeral 2 denotes a buffer section serving as buffer means, numeral 3 denotes a storage section, and reference characters 4a to 4c respectively denote shift registers of a CCD structure serving as readout means, and reference characters 5a to 5c respectively denote output amplifiers. All of the elements except the image sensor section are shielded from light rays.

The image sensor section 1 is made of a plurality of horizontal line sensors having a transfer function and disposed in the horizontal direction. Electrical charges in the respective line sensors are simultaneously transferred to the left of the figure when transfer electrodes mounted on an insulation layer on the semiconductor substrate are operated upon.

Each line sensor is separated from others with a channel stopper CS.

The buffer section 2 is made of a plurality of horizontal line CCDs for changing time relative to their transference, each line CCD having 4-bit capacity in the present embodiment.

Electrical charges in the respective horizontal line CCDs of the buffer section 2 are simultaneously transferred one bit at a time to the left direction of the figure when the transfer electrodes are operated upon.

The storage section 3 is made of a plurality of line CCDs disposed horizontally. The signal horizontally transferred from the image sensor section via the buffer section 2 is temporarily input to and stored in each line CCD as its electrical charge, and thereafter the electrical charges in the respective line CCDs are simultaneously and vertically transferred one line at a time down to the horizontal shift registers 4a to 4c to thereby read them as image signals. At the time when one line shift of the storage section 3 is effected, respective electrical charges are distributed into each horizontal shift register 4a to 4c.

At the same time as above, each horizontal shift register 4a to 4c obtains every third bit in one line data of the storage section. In particular, signals corresponding to the 1st, 4th, 7th, 10th bits, ... in the one line data of the storage section are stored, for example, in the register 4a. Signals corresponding to the 2nd, 5th, 8th, 11th bits, ... are stored, for example, in the register 4b. Signals corresponding to the 3rd, 6th, 9th, 12th bits, ... are stored in the shift register 4c, for example.

It is, therefore, sufficient so long as the number of bits of each register in the horizontal direction is about one third of the bit number of the storage section in the horizontal direction.

Such method for distributing electrical charges is described in detail in Japanese Patent Application No. 59-35699 by the same applicant, so the detailed explanation therefor is omitted herein.

One line of data is distributed in the way as described above to the respective shift registers 4a to 4c at every shift of one vertical line of the storage section. Next, the contents in the respective registers are horizontally transferred generally during the same time as the horizontal scan time of the standard television periods.

The electrical charges horizontally transferred are respectively converted into voltage signals and output from the output amplifiers 5a to 5c.

Reference characters OFD0 and OFD1 denote overflow drains. The overflow drain OFD0 drains electrical charges in the storage section 3 by horizontally transferring the determined amount of electrical charges, while the overflow drain OFD1 drains electrical charges in the storage section 3 by vertically transferring the determined amount of electrical charges. An electrical charge injection section ID includes a terminal for injecting electrical charges into at least the uppermost horizontal shift register of the image sensor section 1. By provision of such a terminal, it is easy to check the transfer efficiency and the like of the storage section 3 and horizontal registers 4a to 4c.

The injection section may be constructed such that horizontal registers for several lines adjacent the uppermost line registers of the image sensor section are adapted to be injected with electrical charges. The present invention is intended to include such arrangement of the injection section.

A black level detector section DDA 7 is formed by shielding from light the start portion in the horizontal direction of the image sensor section.

In the present embodiment, the CCD structure of a single phase drive method is illustratively used.

As a high level voltage is applied to the transfer electrode, the potential level in the substrate under the transfer electrode becomes relatively low with respect to the potential level of an electron so that a well is formed to thereby collect electrical charges to the area under the transfer electrode.

Alternatively, as a low level voltage is applied to the transfer electrode, a relative potential well is formed at the left side of the lower side of the substrate where the transfer electrode is not present. Therefore, electrical charges collected under the transfer electrode are transferred to the left or lower side area.

In FIG. 2, a dot portion $P_{\phi O}$ and is an odd line electrode while $P_{\phi E}$ is an even line electrode, both $P_{\phi O}$ and $P_{\phi E}$ being connected in common. L1 to L4 respectively denote horizontal shift registers constituting the image sensor section 1. An oblique left-side-upper line portion CS represents a channel stopper.

An oblique right-side-upper line portion OFD2 represents an overflow drain formed between respective registers L1 to L4.

VB represents a fixed potential barrier area, VW represents a fixed potential well area, CB represents a variable potential barrier area, and CW represents a variable potential well area. Assuming that the potentials at respective areas relative to electron are P(VB), P(VW), P(CB), and P(CW), then P(VB)>P(VW) and P(CB)>P(CW) are realized at any time. If a high level voltage is applied to the electrodes $P_{\phi O}$ and $P_{\phi E}$, the following relation is established:

P(VW)>P(CB)

and for a low level voltage:

P(CW)>P(VB)

Therefore, upon application of an AC voltage to the electrodes $P_{\phi O}$ and $P_{\phi E}$, electrical charges move toward the left as of the figure. Electrical charges higher in potential than P(VB) flow into the drain OFD2, thereby preventing blooming. Such single phase drive method may be the method disclosed in the Official Gazette of Japanese Patent Laid-open (Kokai) No. 55-11394 In the present embodiment, the size and shape of each pixel PE1 constituting each horizontal shift register L1 to L4 is substantially the same so that scattering of sensitivity centers of the respective pixels for light rays having various spectral characteristics becomes uniform and moire patterns are not likely to be produced, which is also one of the features of the present invention.

Furthermore, in the present invention, since the electrodes $P_{\phi O}$ and $P_{\phi E}$ are located along and above the overflow drains OFD2, the width of each electrode can be widened, thereby enabling to reduce the distributed resistance component and not to generate shading in the high frequency range. In addition, the rate of opening for each pixel is not deteriorated.

Figure 3:
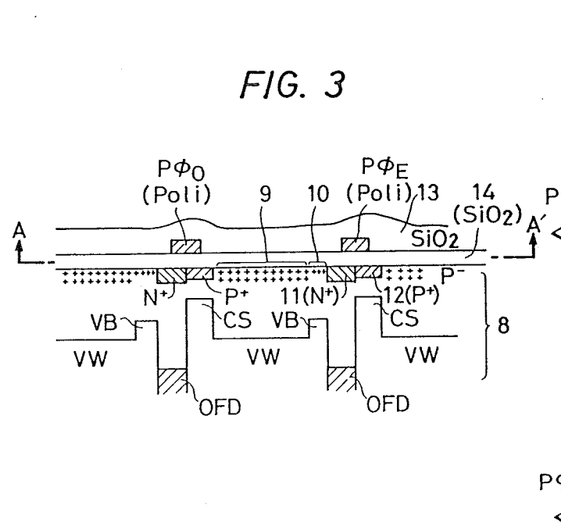
FIG. 3 is a cross sectional view along the line A-A' of FIG. 2.

FIG. 3 is a cross sectional schematic diagram along the line A—A' of FIG. 2. Numeral 8 represents a P⁻-type semiconductor substrate made of silicon, and numerals 9 and 10 represent donor doped ion regions. Numeral 11 represents an N⁺-region for forming a drain, numeral 12 represents a P⁺-region for forming a channel stopper, and numerals 13 and 14 represent insulation layers made of $SiO_2$.

Figure 4:
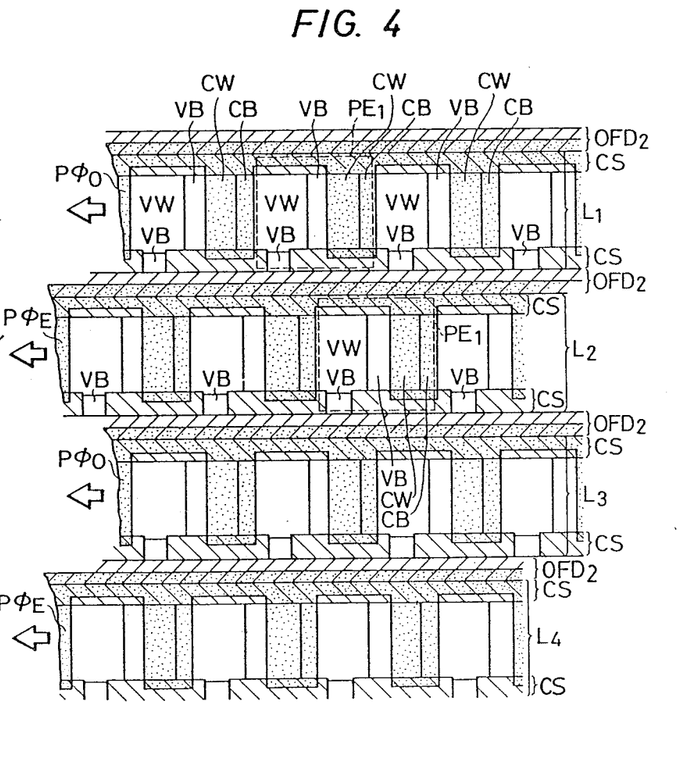
FIG. 4 shows another example of the structure of the image sensor section.

FIG. 4 shows a pattern for electrodes according to the second embodiment of the invention. In the figure, elements designated by the same numerals as of FIGS. 1 to 3 have the same function as of FIGS. 1 to 3. In this embodiment, each pixel on one line is located shifting in phase from each pixel on an adjoining line by half a pixel. Owing to this arrangement, the horizontal resolution is improved.

Figure 5:
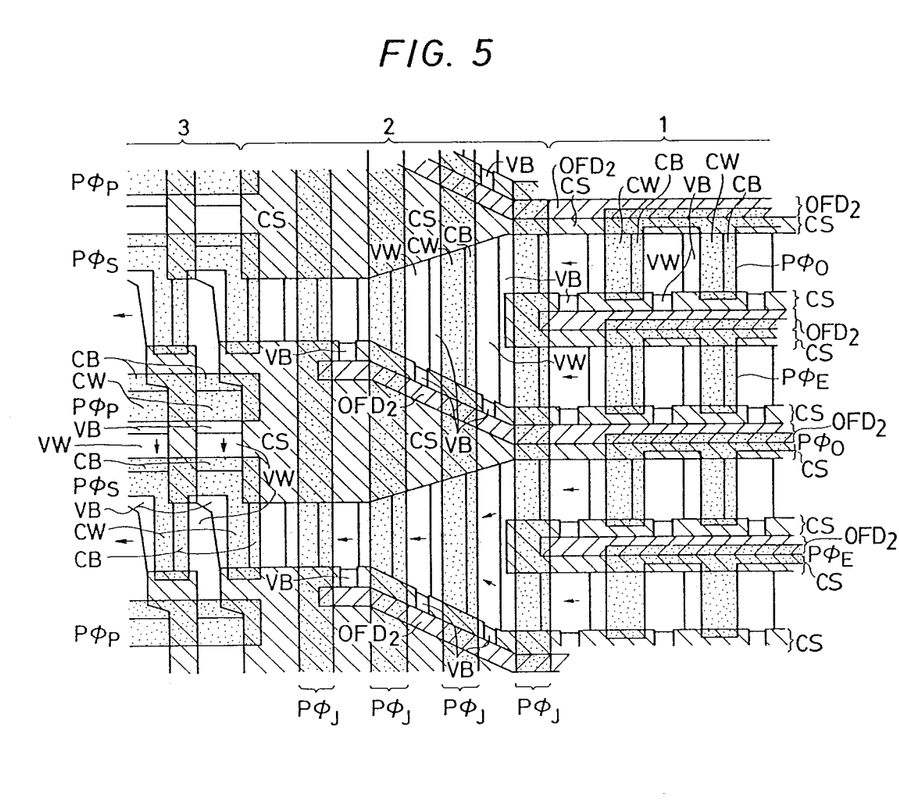
FIG. 5 shows an example of the structure of the buffer section.

FIG. 5 shows a pattern for electrodes associated with the buffer section 2 of FIG. 1 according to the third embodiment of the invention, wherein the structure of the image sensor section 1 is identical with that shown in FIG. 2. In FIG. 5, elements designated by the same numerals as of FIGS. 1 to 4 have the same function as of FIGS. 1 to 4. Transfer electrodes $P_{\phi J}$ for the buffer section are supplied with pulses $\phi_J$. In this embodiment, the buffer section is composed of 4 pixels (bits) as shown in the figure. A pair of odd and even lines of the image sensor section 1 can be transferred via a single common path. More specifically, electrical charges in certain odd and even lines, either the charges in one of the lines or the added charges in both lines, can be transferred selectively.

The buffer section is provided with the overflow drains OFD2, or means for clearing overflow charges, near the transfer paths and constructed such that overflow charges are gradually drained during transference. Therefore, in case of transference of both electrical charges in the odd and even lines, there occurs no overflow. Furthermore, it is not necessary to make the capacity of the buffer section 2 and storage section 3 large, thereby facilitating to design the electrode pattern. This is one of the features of the embodiment of the invention. The buffer section is of course shielded from light. The storage section 3 is constructed as shown in the figure so as to enable both horizontal and vertical transferences. $P_{\phi P}$ represents vertical transfer electrodes and $P_{\phi S}$ represents horizontal and vertical transfer electrodes, with pulses $\phi_P$ and $\phi_S$ supplied thereto, respectively.

Figure 6:
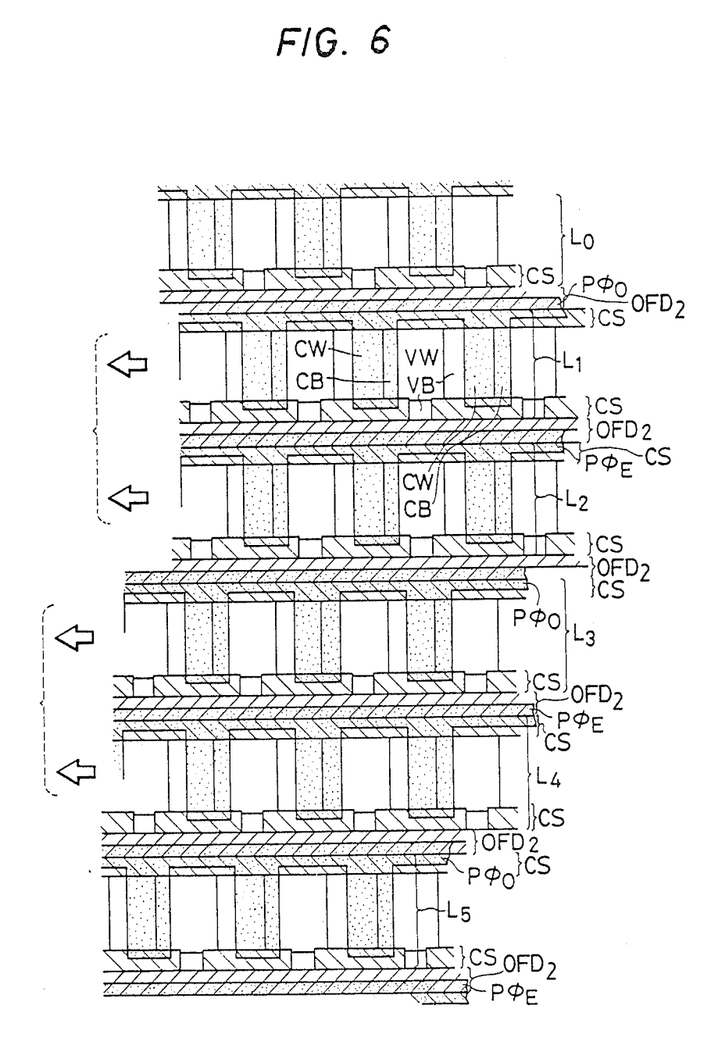
FIG. 6 shows an example of the structure of the image sensor section.

FIG. 6 shows a pattern for electrodes of the image sensor section 1 of the fourth embodiment of the invention. In this embodiment, pixels on a pair of lines are aligned to have the same phase in the vertical direction, while pixels on adjoining pairs of lines are located having shift in phase of half a pixel in the horizontal direction. Although it is not shown in the figure, information of the pixels on the two lines aligned in phase in the horizontal direction are coupled at the buffer section to pass through a common transfer path in the buffer section.

With such electrode pattern, readout through addition of electrical charges of the two lines having the same phase does not cause mixing of respective pixel charges relative to the horizontal direction. Moreover, since pixels on the lines having different phase are shifted in phase, a high horizontal resolution can be obtained.

Figure 7:
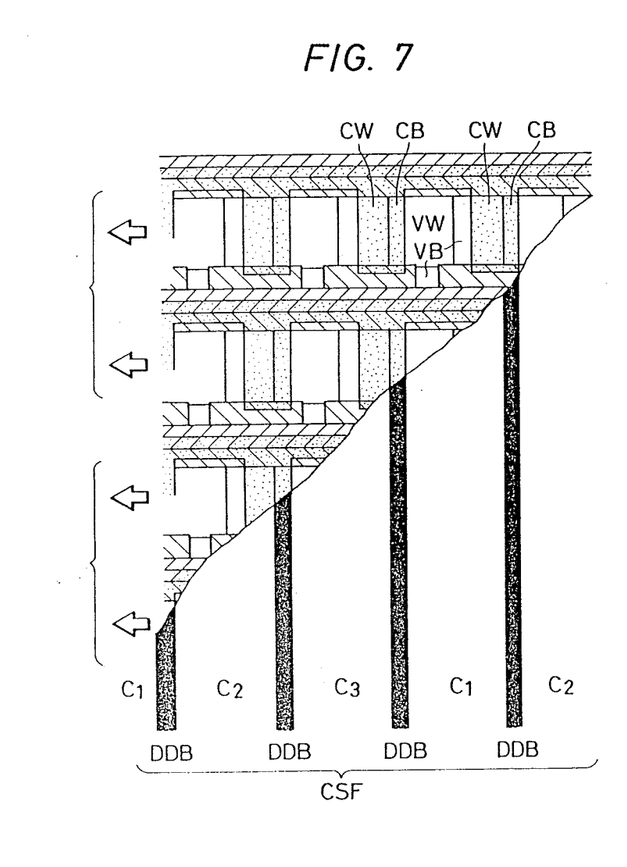
FIGS. 7 to 10 show examples of the arrangement of the color filter according to the present invention.

FIG. 7 shows an example of a color separation filter CSF for the electrode pattern of FIG. 2 according to the fifth embodiment of the invention. In the figure, a light shielding section DDB features in the arrangement that the section is located above the variable potential barrier section CB. In particular, in order to suppress dark current in the semiconductor substrate, it is preferable to apply a low level potential to the electrodes $P_{\phi O}$ and $P_{\phi E}$. In this case, during image sensing, the potential well is formed at VW and the boundary of each pixel is the CB area. Therefore, with the light shielding section positioned above the CB area, it is possible to prevent mixing of electrical charges between adjoining pixels in the horizontal direction. Filters C1, C2, C3 are R, G and B filters or may be filters of any other color combination.

Figure 8:
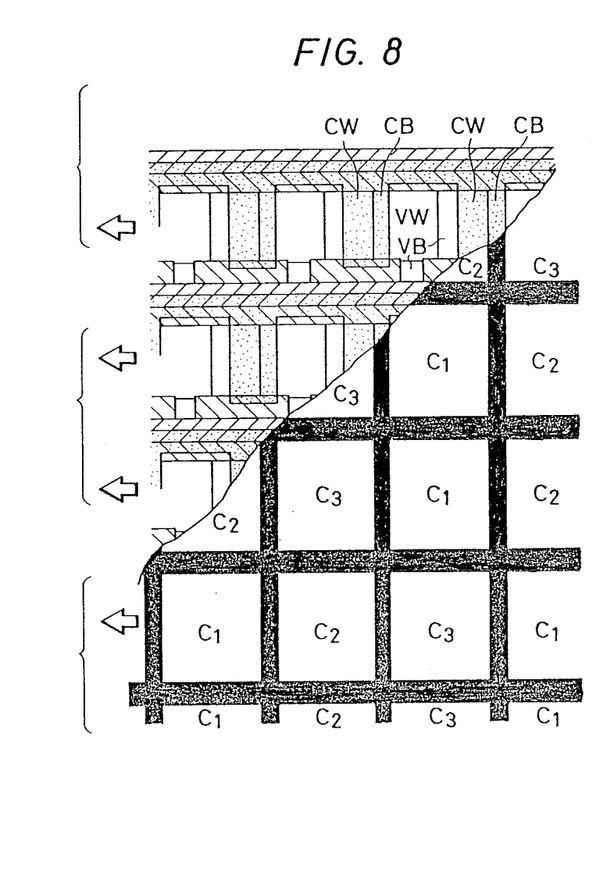

FIG. 8 shows an example of a color separation filter for the embodiment of FIG. 2 according to the sixth embodiment of the invention. In this embodiment, color filters for adjacent lines in the image sensor section are different in color, while in the horizontal direction at least three colors are periodically used. This arrangement is very effective in using signals of each line without vertical corelation processing as compared with conventional mosaic filters. Particularly it is advantageous in that moire on the edge of an object with a high color saturation degree is rendered imperceptible. In this embodiment also, the color filters C1, C2 and C3 are composed of for example combinations of R, G and B; R, G and C; or Y, G and C. One of the features of this embodiment is that the light shielding section of the filter CSF is located above the overflow drain OFD2.

Figure 9:
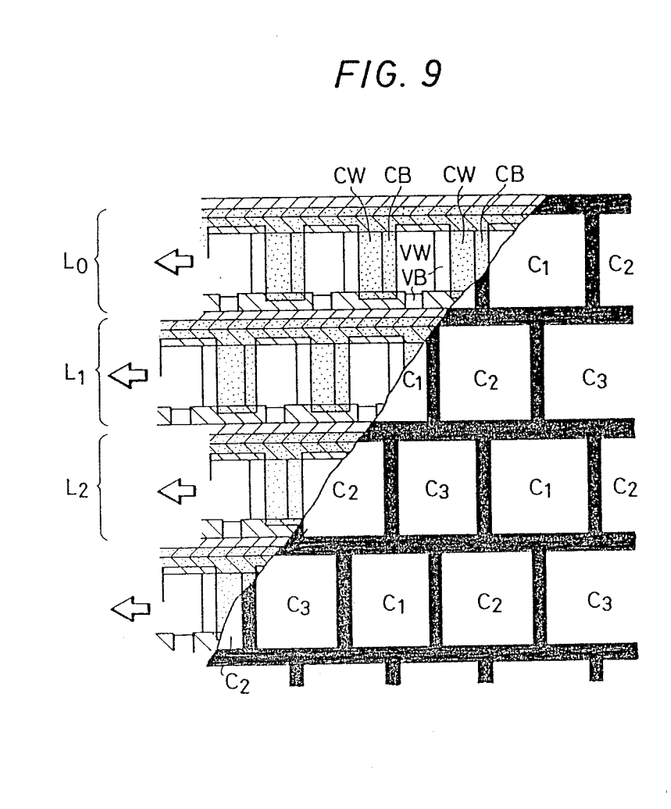

FIG. 9 is directed to the seventh embodiment of the invention, which shows an example of a color separation filter CSF suitable for use with the electrode pattern of FIG. 4. In this embodiment, the mosaic filter arrangement is employed similarly to the filter CSF of FIG. 8. Similarly, the light shielding section is positioned above the CB and OFD2. In this embodiment however, pixels on adjoining lines in the vertical direction have a phase shift of half a pixel. Therefore, the order of filters for example C1, C2 and C3 on the line L1 is so arranged to shift by 1.5 pixel in phase relative to the orders of filters on the adjoining lines L0 and L2. With such arrangement, not only the horizontal resolution of luminance in case of forming an image signal from lines L0, L1, L2, . . . is improved, but also moire for an object with a high color saturation degree is reduced visually.

Figure 10:
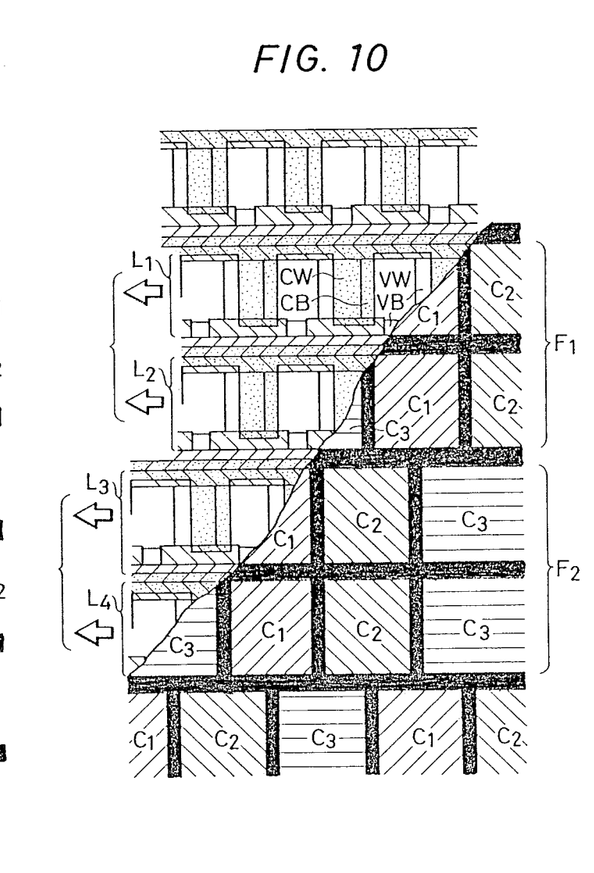

FIG. 10 is directed to the eighth embodiment of the invention, which shows an example of a color separation filter CSF suitable for the electrode pattern of FIG. 6. In this embodiment, a mosaic arrangement of color filters is employed for respective pixels, and two lines (e.g., L1 and L2) with pixels having the same phase are provided with a color filter F1, while other two lines (e.g., L3 and L4) with pixels having different phases is provided with a filter F2. In this case, the phase of the filter F2 is so arranged to shift by 1.5 pixel relative to the phase of the filter F1. With such arrangement, color mixing is not produced in case of the readout through addition of electrical charges in the pixels on two lines having the same phase. Furthermore, sequentially reading the lines different in pixel phase permits visual reduction of moire of an object having a high color saturation degree.

Figure 11:
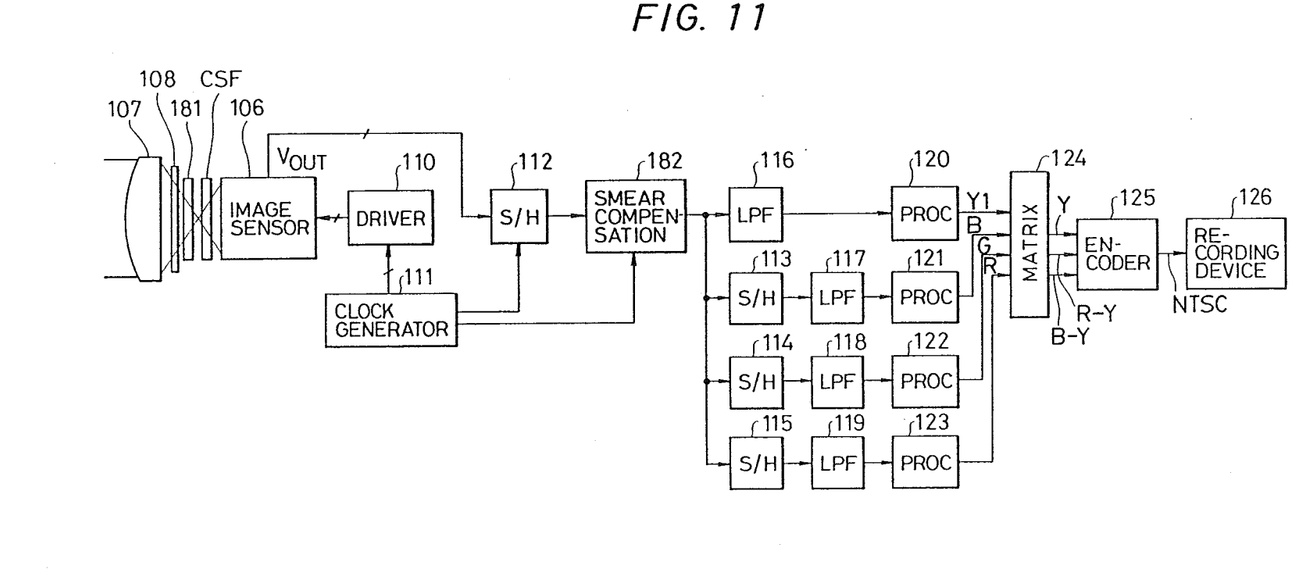
FIG. 11 is a block diagram of the image sensing apparatus according to the present invention.

FIG. 11 is directed to the ninth embodiment of the invention, which shows a block diagram of the image sensing apparatus according to the present invention. Light from an object to be sensed is focused on an image sensor 106 by way of an optical imaging system 107, an infrared ray cut-off filter 108, a stop and shutter mechanism 181 and a color separation filter CSF. A clock pulse generator 111 generates various clock pulses in a movie mode, field still mode, frame still mode and etc. The output from the clock generator 111 is amplified at a driver 110 for suitable supply to the image sensor 106. The clock generator 111 and the driver 110 constitutes drive means. Consequently, as will be described later, the image sensor 106 outputs a color signal in the form of three series time sequence. The time sequence color signal is subjected to a sample-and-hold circuit 112 for improving the duty ratio thereof and facilitating following sampling and holding for each color signal. In addition, the three series time sequence signal is again converted into a dotsequential signal.

A black level smear compensation circuit of the present invention performs the clamp of an electrical signal level from the black level detection section 7 of the image sensor section 6 shown in FIG. 1 and makes the clamped level to have a predetermined reference level.

The black level section 7 shielded from light as shown in FIG. 1 is provided at the end of the horizontal registers of the image sensor section. Therefore, during the horizontal blanking period, by clamping or feedback-clamping the image signal through the sample-and-hold circuit 112 to the above reference level, it is possible to effect dark current compensation and also to eliminate the smear component of the image sensor section in the horizontal line direction.

Sample-and-hold circuits 113 to 115 perform sampling of the dot-sequential color signal at a period corresponding to the color repetition period of the color filter and at each color phase, and perform holding the sampled signal thereafter. Of LPFs 116 to 119, the LPF 116 has a cut-off frequency of about 3 MHz for example, while the LPFs 117 to 119 have cut-off frequencies of about 500 KHz. Process circuits 120 to 123 perform various compensations respectively for the LPFs 116 to 119, e.g., γ-correction, white clip, APC and etc. A matrix circuit 124 generates, from respective Y1, B, G and R signals received from the process circuits 120 to 123, for example, luminance signal Y and color difference signals R-Y and B-Y. An encoder 125 generates a standard television signal such as NTSC signal. A recording device 126 records the standard television signal.

Next, examples of the outputs from the driver 110 and the clock generator 111 shown in FIG. 11 and the operation associated with the arrangement of FIG. 1 will be described with reference to FIG. 12.

Figure 12:
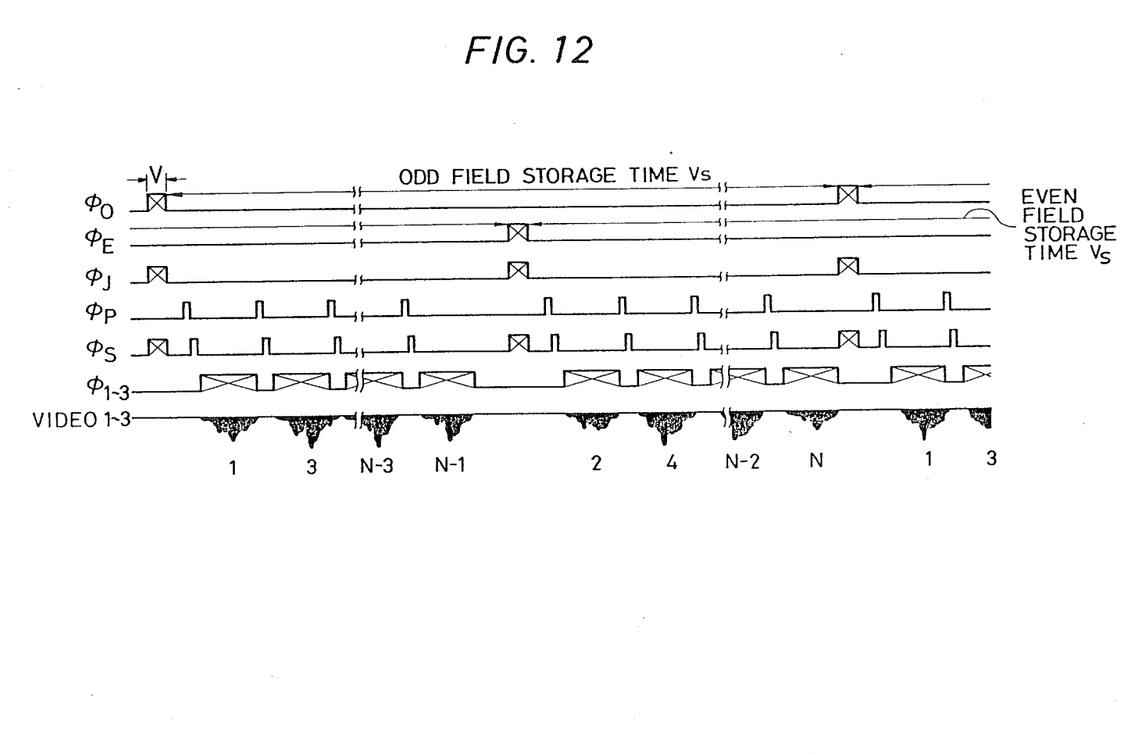
FIGS. 12 to 14 are timing charts for the circuit shown in FIG. 11.

FIG. 12 is a timing chart in the movie mode. In the figure, Vs represents the vertical scanning time of the standard television signal, and V represents the vertical blanking time. The clock generator 111 supplies M pulses of high speed clock pulses $\phi_O$, $\phi_J$ and $\phi_S$ during the blanking time. Consequently, information in the odd lines out of the electrical charges in N lines x M columns stored in the image sensor section 1 by that time, is transferred in the horizontal left direction as of FIG. 1 and temporarily stored in the storage section 3 through the buffer section 2.

The horizontal transference is carried out one bit at a time every time the voltage applied to each electrode falls to a low level from its high level, as described previously.

Although it is not shown in the figure, in case of temporal transference of electrical charges in the image sensor section 1 to the storage section 3 in response to the clock generator 111, the transference operation during the horizontal transference time V is intermittently stopped at a period corresponding to the color repetition period of the color separation filter CSF in the horizontal direction, i.e., at 3 bit period.

During the horizontal transference, the time during which electrical charges are, therefore, stored in the same color filter areas becomes relatively longer, while on the other hand the time during which electrical charges are stored in different color filter areas becomes relatively shorter. As a result, the amount of electrical charges for the different color, which might be generated at the time of passing through the different color filter during the transference period, reduces. Thus, for the image sensing apparatus which employs a determined periodical color repetition pattern in the transference direction of each line sensor of the image sensor section, color mixing is reduced and the quality of color regeneration can be improved.

After electrical charges are stored in the storage section 3, one pulse $\phi_P$ for vertical transference and one pulse $\phi_S$ are supplied, thereby shifting the electrical charges in the storage section by one line downward as of FIG. 1. In this case, as previously explained, $\phi_1$ to $\phi_3$ are supplied at predetermined timings for periodical distribution of the one line information to the registers 4a to 4c, and the distributed information is read out of each register during one horizontal time. Repeating the above operations permits reading out the odd field signal during one vertical scanning time.

Alternatively, at the next vertical blanking time, $\phi_E$, $\phi_J$ and $\phi_S$ are supplied at high speed so that even line signals stored during the two field periods are stored in the storage section. Therefore, at similar times to those in the odd line readout, even line signals are read to output an even field signal.

The above description of the operations has been directed to the combination of the electrode pattern and the filter CSF shown in FIG. 7 embodiment. In case of the embodiment shown in FIGS. 8 or 10 wherein the phase of the color filter in the horizontal direction changes at every 1H time, the spatial position of color is properly rearranged by changing the timings for distribution from the storage section to the registers 4a to 4c.

In the embodiment shown in FIG. 9, it is not necessary to change the distribution timings at every 1H time. However, in this case, the spatial position of color is properly rearranged either by changing the distribution timings at every 1 field or by changing the sampling timings for the sample-and-hold circuits 113 to 115 shown in FIG. 11.

Figure 13:
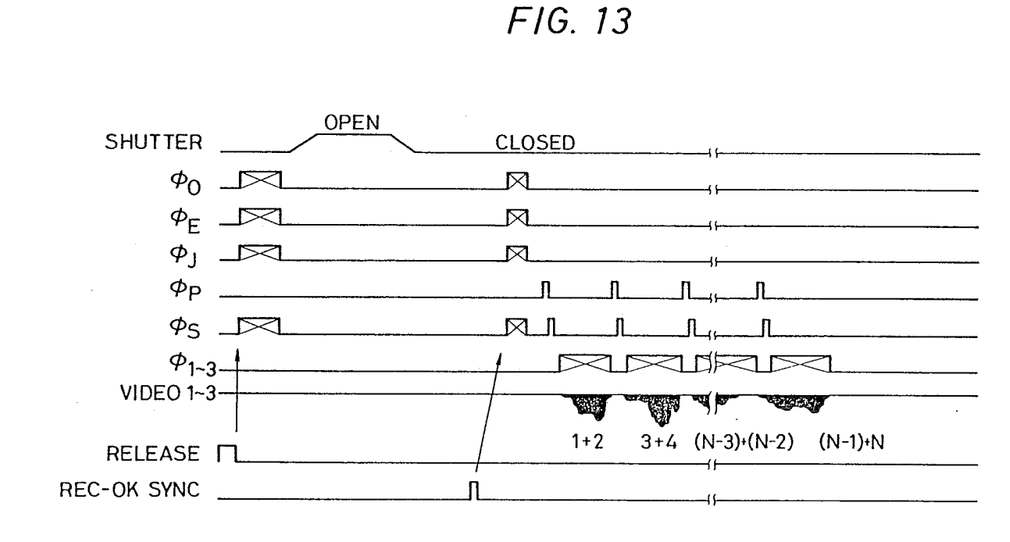

FIG. 13 is a timing chart for the driving in the field still mode in which an image formed at the image sensor section is read as one field signal of the standard television signal. Upon turning on an unrepresented power switch for power supply to associated circuits, and thereafter upon turning on a not shown release switch, the clock generator 111 outputs a release pulse as shown in the figure in response to the following vertical sync signal.

In response to the release pulse, more than M pulses of $\phi_O$, $\phi_E$, $\phi_J$ and $\phi_S$ pulses are supplied and electrical charges in the image sensor section are temporarily cleared. Furthermore, the electrical charges are drained from the overflow drains OFD1 for example. Then, the shutter mechanism 81 continues to actuate for a predetermined time in order to receive light rays with the image sensor section. When motors for driving heads, mediums and so on in the recording device reach their stable conditions after turning on the power switch, the recording device 126 outputs a REC-OK sync signal. If the sync signal is received after a preset time interval from the release signal, as shown in FIG. 13, m pulses of $\phi_O$, $\phi_E$, $\phi_J$ and $\phi_S$ pulses are supplied at high speed. As a result, electrical charges in the odd and even lines of the image sensor section are added for each pair of lines at the buffer section and thereafter stored in the storage section. Thereafter, the stored information is read as a field signal at the timings similar to those of FIG. 12.

The above operations are applicable directly to the embodiment of FIG. 7, and in case of the embodiment of FIG. 8, only the change in distribution to the registers 4a to 4c at every 1H time can suffice. Furthermore, in case of the embodiment of FIG. 10, only the change of the timing of the sample-and-hold circuit 113 to 115 for shifting the phase at every 1H time can suffice.

Figure 14:
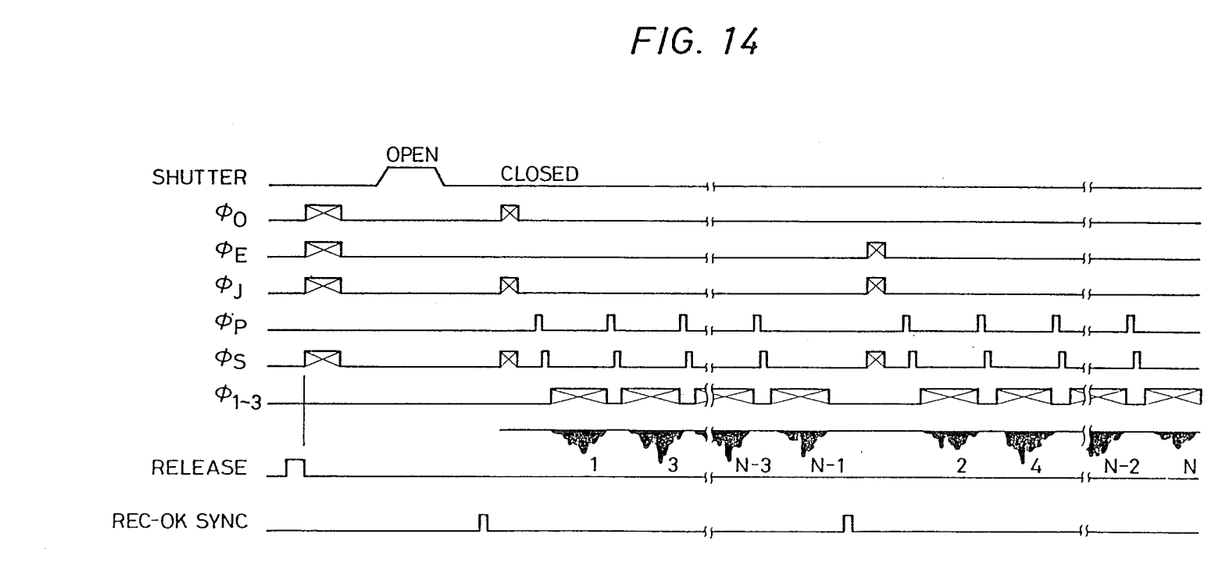

FIG. 14 shows a timing chart in the frame still mode according to the present invention. In this mode, image information produced by a single image sensing is read out as two interlaced field signals.

The timing for this mode differ from the timing of FIG. 13 in the following points: upon reception of the REC-OK sync signal from the recording device after storage of an image in the image sensor section, about M pulses of $\phi_O$, $\phi_J$ and $\phi_S$ are supplied at high speed. Thus, only odd signals are stored in the storage section. Thereafter, the signals in the storage section 3 are sequentially read out by the registers 4a to 4c. Again, a REC-OK sync signal is output from the recording device upon completion of the transfer of the recording truck. This time, M pulses of $\phi_E$, $\phi_J$, and $\phi_S$ are supplied to thereby store the even line signals in the storage section 3 and read out the signals through the registers 4a to 4c at the standard television period.

The above operations are applicable directly to the embodiment of FIG. 7, and in the case of the embodiment of FIG. 8, the change in distributing to the registers 4a to 4c at every 1H time prevents color mixing. In case of the embodiment of FIG. 9, the change in phase of the pulses $\phi_1$ to $\phi_3$ for the registers 4a to 4c at every field allows rearrangement of the spatial position of colors. Furthermore, by changing the timing for the sample-and-hold circuits 113 to 115 at every 1H time, color mixing can be avoided. In case of the embodiment of FIG. 10, the rearrangement of spacial position of colors is effected by shifting the phase of the pulses $\phi_1$ to $\phi_3$ at every 1H time. The change of the sampling timing for the sample-and-hold circuits 113 to 115 at every 1H prevents color mixing.

What is claimed is:

1. An image sensing apparatus comprising:
   (a) an image section capable of receiving light comprising a plurality of horizontal shift registers juxtaposed in the vertical direction;
   (b) a black level detection section which is shielded from light and formed at the start portion of transference of each horizontal shift register of said image section;
   (c) a storage section formed adjoining said image section in the horizontal direction for storage of image signals produced in said image section and black level signals produced in said shielded section; and
   (d) readout means for reading out the signals stored in said section line by line, each line being read out in a horizontal scanning period.

2. An image sensing apparatus according to claim 1, further comprising smear compensation means for clamping a black level signal in the signals read out by said readout means to a predetermined reference level.

3. An image sensing apparatus according to claim 1, wherein said readout means includes a plurality of shift registers.

4. An image sensing apparatus according to claim I, wherein said readout means includes at least one horizontal shift register and an overflow drain provided in the vicinity of said at least one horizontal shift register.

5. An image sensing apparatus comprising:
   (a) an image section capable of receiving light comprising a plurality of horizontal shift registers juxtaposed in the vertical direction;
   (b) a black level detection section which is shielded from light and formed at a peripheral portion of each horizontal shift register of said image section;
   (c) a storage section formed adjoining said image section in the horizontal direction for storage of image signals produced in said image section and black level signals produced in said shielded section;
   (d) readout means for reading out the signals stored in said storage section line by line, each line being read out in a horizontal scanning period; and
   (e) compensation means for clamping a black level signal in the signals of one horizontal line read out by said readout means to a predetermined level.

6. An image sensing apparatus according to claim 5, wherein said readout means includes a plurality of shift registers.

7. An image sensing apparatus according to claim 5, wherein said readout means includes at least one horizontal shift register and an overflow drain provided in the vicinity of said at least one horizontal shift register.

* * * * *

UNITED STATES PATENT AND TRADEMARK OFFICE
CERTIFICATE OF CORRECTION

PATENT NO. : 4,811,105

DATED : March 7, 1989

INVENTOR(S) : TAKAO KINOSHITA, ET AL.

It is certified that error appears in the above-identified patent and that said Letters Patent is hereby corrected as shown below:

COLUMN 2

Line 10, "lines" should read --line--.
    Line 17, "of line," should read --of a line,--.

COLUMN 5

Line 13, "as" should be deleted.
    Line 18, "55-11394" should read --55-11394.--.

COLUMN 6

Line 54, "corelation" should read --correlation--.
    Line 55, "Particularly" should read --Particularly,--.

COLUMN 7

Line 48, "dotsequential" should read --dot-sequential--.

COLUMN 8

Line 4, "APC and" should read --APC,--.

UNITED STATES PATENT AND TRADEMARK OFFICE
CERTIFICATE OF CORRECTION

PATENT NO. : 4,811,105

DATED : March 7, 1989

INVENTOR(S) : TAKAO KINOSHITA, ET AL.

It is certified that error appears in the above-identified patent and that said Letters Patent is hereby corrected as shown below:

COLUMN 9

Line 32, "shutter mechanism 81" should read --shutter mechanism 181--.

Line 57, "differ" should read --differs--.

COLUMN 10

Line 31, "said section" should read --said storage section--.

Line 40, "claim I," should read --claim 1,--.

Signed and Sealed this

Twelfth Day of December, 1989

Attest:

JEFFREY M. SAMUELS

*Attesting Officer*    *Acting Commissioner of Patents and Trademarks*